(12) United States Patent
Luo et al.

(10) Patent No.: US 8,313,259 B2
(45) Date of Patent: Nov. 20, 2012

(54) KEYBOARD

(75) Inventors: Ting Luo, Shenzhen (CN); Xian-Wei Ma, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 460 days.

(21) Appl. No.: 12/756,969

(22) Filed: Apr. 8, 2010

(65) Prior Publication Data

US 2011/0097132 A1 Apr. 28, 2011

(30) Foreign Application Priority Data

Oct. 28, 2009 (CN) .......................... 2009 1 0308961

(51) Int. Cl.
*B41J 5/00* (2006.01)
(52) U.S. Cl. .......................... 400/472; 400/701; 15/21.1
(58) Field of Classification Search .................. 400/472, 400/701–702.1; 15/21.1
See application file for complete search history.

(56) References Cited

U.S. PATENT DOCUMENTS

| | | | | |
|---|---|---|---|---|
| 5,299,341 A * | 4/1994 | Wakao | .......................... | 15/210.1 |
| 5,870,116 A * | 2/1999 | Kyoshima | .......................... | 347/33 |
| 6,094,778 A * | 8/2000 | Boukas | .......................... | 15/409 |
| 6,298,514 B1 * | 10/2001 | Lazich et al. | .................. | 15/106 |
| 6,854,153 B1 * | 2/2005 | Mueller | .......................... | 15/210.1 |
| 2002/0133900 A1 * | 9/2002 | Perkins | .......................... | 15/320 |

* cited by examiner

*Primary Examiner* — Ren Yan
*Assistant Examiner* — David Banh
(74) *Attorney, Agent, or Firm* — Altis Law Group, Inc.

(57) ABSTRACT

A keyboard includes a housing defining a dust opening, a plurality of rows of keys mounted in the housing with two of the a plurality of lines of the keys forming a horizontal gap and at least one cleaning device. Each of the cleaning devices is secured in one of the horizontal gaps. The cleaning device includes a driving rod and a cleaning brush. One end of the driving rod is rotatably fixed to the sidewall of the housing, and the other is driven to rotate the driving rod. The driving rod defines an outer threading thereon. The cleaning brush includes a sleeve and a plurality of arms fixed on the outer surface of the sleeve. The sleeve defines an inner thread cooperated with the outer thread of the driving rod. The driving rod rotates to move the cleaning brush along the driving rod.

9 Claims, 5 Drawing Sheets

KEYBOARD

BACKGROUND

1. Technical Field

The present disclosure relates to a keyboard.

2. Description of Related Art

Keyboards as peripheral devices for computers are widely used in home and office, however, dust and other impurities in the working environment of computers can easily infiltrate the assemblies of the keyboard components, such as between keys of the keyboard, thus affecting usability and lifetime of the keyboards. Further, cumulated dust and other impurities on the keyboards present a fertile breeding ground for bacteria and other harmful substances.

Accordingly, keyboard cleaning brushes, vacuum devices, or other keyboard cleaning systems are employed. Since those cleaning tools are not attached to the keyboards, they need to be located and deployed in cleaning the keyboards, which represents inconvenience for users. Locations of the devices may be forgotten between uses, or the device may be misplaced.

Therefore, what is called for is a keyboard with a cleaning device alleviating the limitations described above.

DETAILED DESCRIPTION

Figure 1:
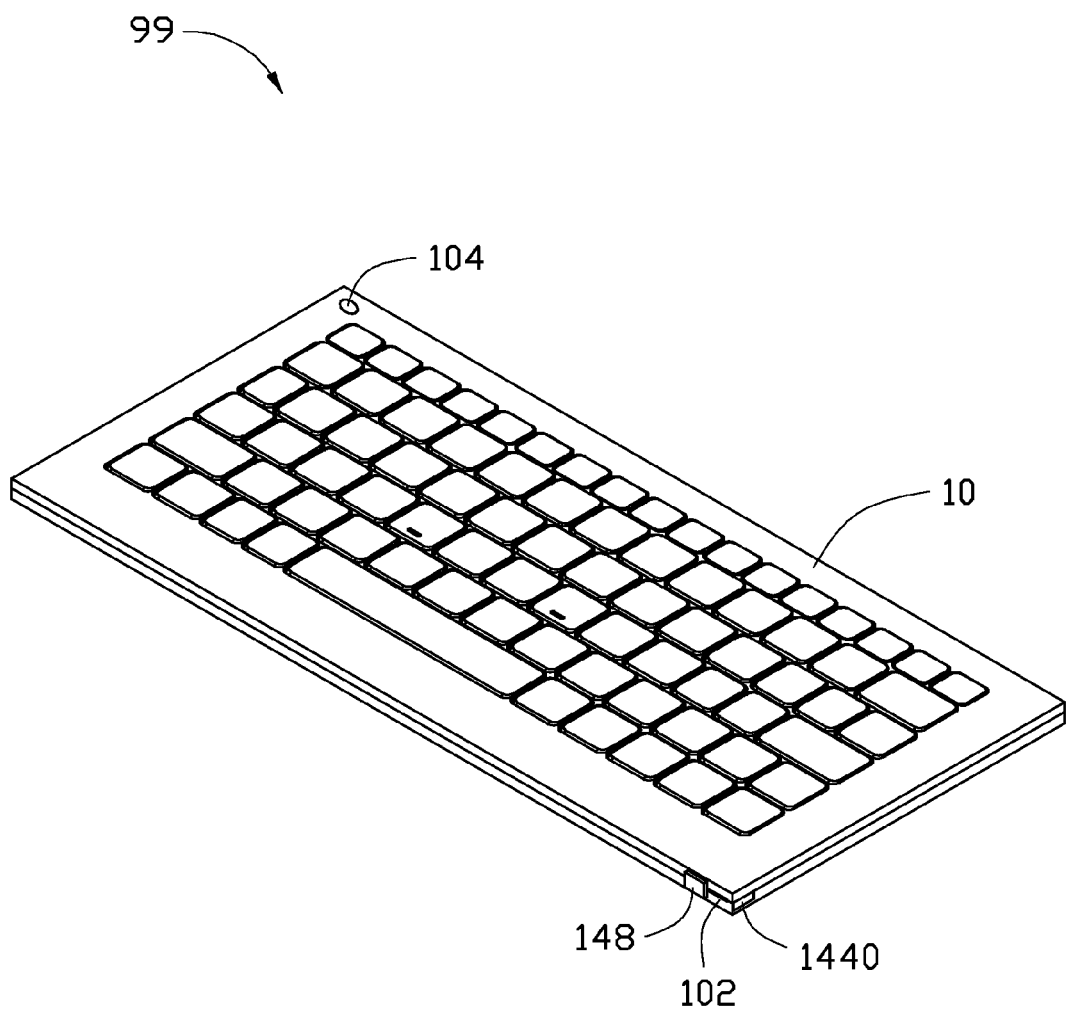
FIG. 1 is an isometric view of an exemplary embodiment of a keyboard with a keyboard cleaning device.
Figure 2:
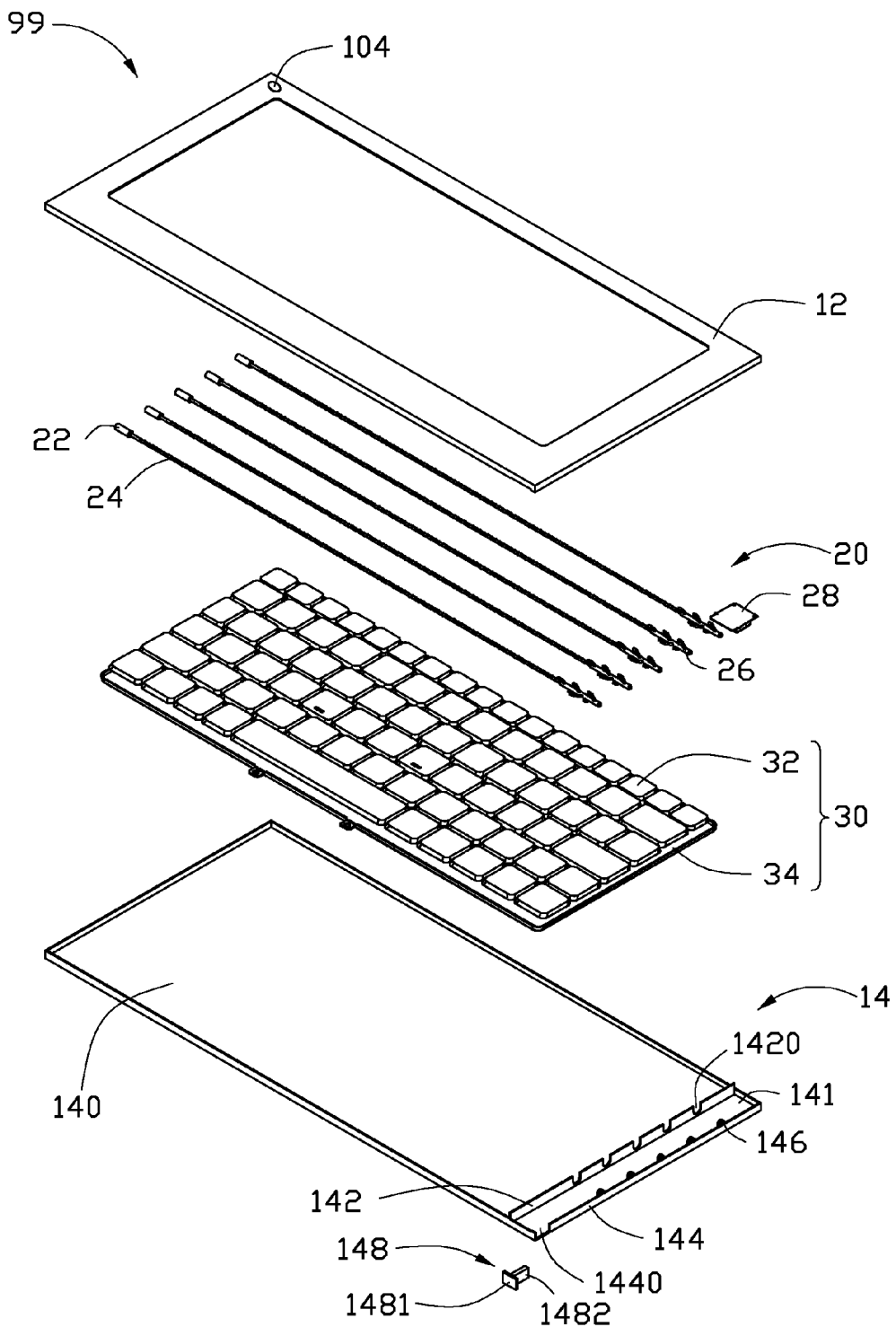
FIG. 2 is an exploded view of the keyboard of FIG. 1.

Referring to FIGS. 1-2, a keyboard 99 is disclosed as an exemplary embodiment. The keyboard 99 includes a housing 10, five cleaning devices 20 and a main body 30 fixed in the housing 10.

In the exemplary embodiment, the main body 30 includes a plurality of rows of keys 32 mounted in the housing 10 and a circuit board 34 for the keyboard 99. Each pair of adjacent rows of the keys 32 forms a horizontal gap. In this embodiment, five horizontal gaps are equidistantly spaced through the a plurality of rows of keys 32.

The housing 10 includes an upper cover 12 and a base cover 14 connected to the upper cover 12 by, for example, hooks or screws.

The four edges of the base cover 14 extend upwardly to form a cavity therein. An isolation plate 142 is extended in the cavity thus the cavity is divided into a key receiving cavity 140 and a dust receiving cavity 141. The a plurality of rows of keys 32 are received in the receiving cavity 140. A plurality of notches 1420 are defined in the isolation plate 142. The number and the location of notches 1420 match those of the horizontal gaps. A plurality of fixing holes 146 are defined on a sidewall 144 of the base cover 14. The sidewall 144 is parallel and close to the isolation plate 142. A dust opening 1440 is defined on the sidewall 144 communicating with the dust receiving cavity 141. In this embodiment, the number of notches 1420 and fixing holes 146 are the same, each of which are five for illustration.

Figure 3:
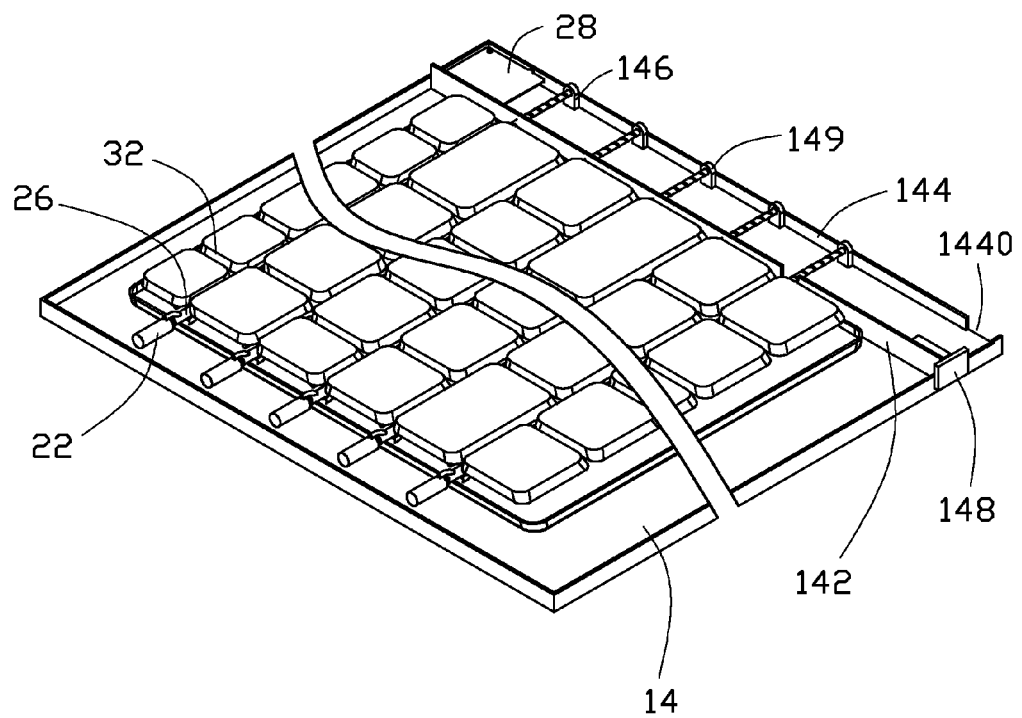
FIG. 3 is an isometric view of the keyboard of FIG. 1 being in an operational state with an upper cover removed.
Figure 4:
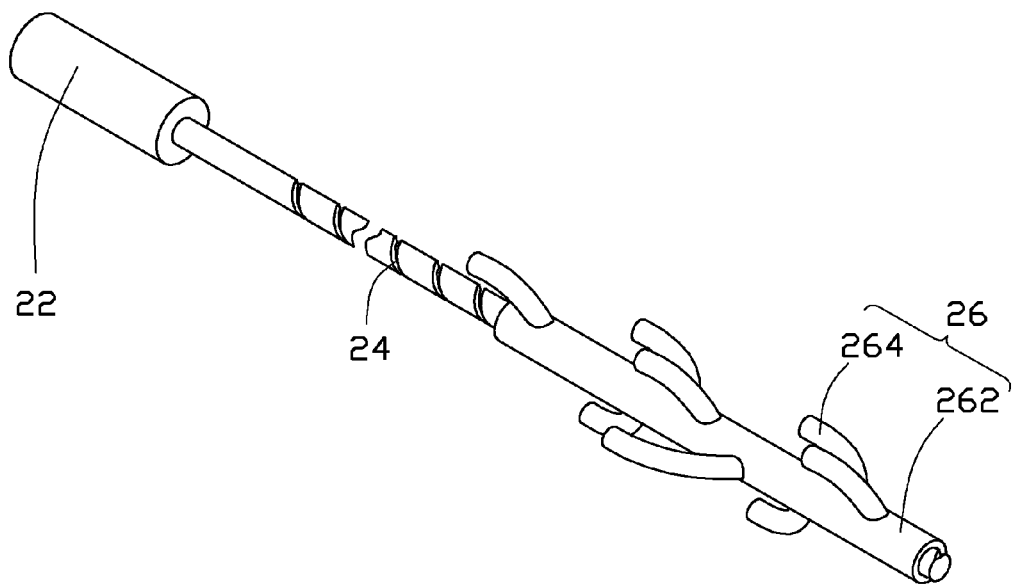
FIG. 4 is an isometric, enlarged view of the keyboard cleaning device of FIG. 2.

Referring to FIGS. 3 and 4, each of the cleaning devices 20 includes a driving rod 24 and a cleaning brush 26 mounted thereon. One end of the driving rod 24 is rotatably fixed on the sidewall 144 of the base cover 14, and the driving rod 24 extends through and is supported by the a plurality of notches 1420 allocated on the isolation plate 142. The other end of the driving rod 24 is received in the fixing hole 146 and rotated therein. The driving rod 24 is located through the horizontal gap. An outer thread is defined on the driving rod 24. The cleaning device 20 further includes a motor 22 connected with the other end of the driving rod 24. The motor 22 is fixed on the base cover 14 and rotates the driving rod 24.

The cleaning brush 26 includes a sleeve 262 and a plurality of arms 264 fixed on the outer surface of the sleeve 262. An inner thread is defined on the sleeve 262. The inner thread cooperates with the outer threading of the driving rod 24. The sleeve 262 is rotationally sleeved on the driving rod 24. The driving rod 24 rotates and drives the cleaning brush 26 along the driving rod 24, with impurities such as dust in the horizontal gaps impelled thereby into the dust receiving cavity 141. The plurality of arms 264 is made of a soft material such as plush.

Referring to FIG. 3, the keyboard 99 further includes a detection device 149. The detection device 149 is mounted at the sidewall 144 of the base cover 14. Arrival of the cleaning brush 26 at the second end of the driving rod 24 is detected by the detection device 149 which then directs the motor 22 to reverse, thereby returning the cleaning brush 26 to the end of the driving rod 24.

Figure 5:
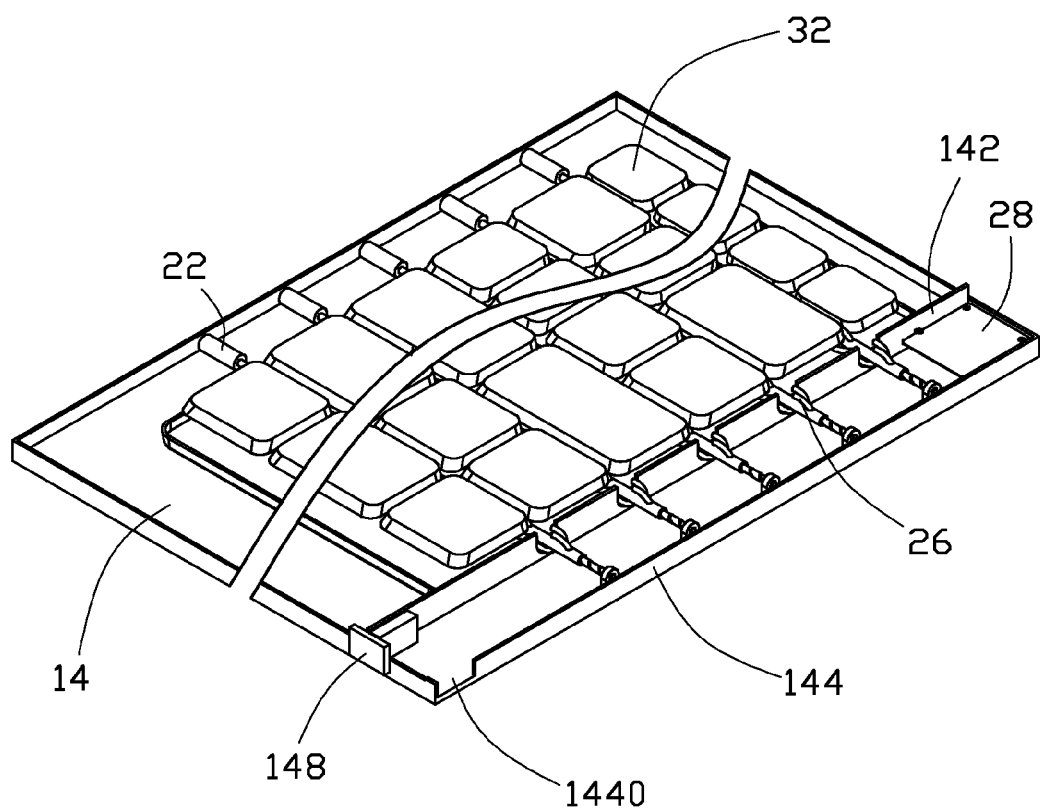
FIG. 5 is an isometric view of the keyboard, similar to FIG. 3, but showing the keyboard cleaning device in a different position of the keyboard.

The keyboard 99 further includes a fan 28 and a control switch 104. The fan 28 is fixed on one end of the dust receiving cavity 141 away from the dust opening 1440. The fan 28 impels impurities received in the dust receiving cavity 141 through the dust opening 1440. The control switch 104 is secured on the upper cover 12 for turning the motor 22 and the fan 28 on and off. The cleaning device 20 is located close to the motor 22. When the control switch 104 is activated, the motor 22 starts and begins to rotate the driving rods 24, and then drives the cleaning brush 26 reciprocate with the driving rods 24. Referring to FIG. 5, when the cleaning brush 26 reciprocates to the fixing hole 146, the detection device 149 detects its arrival, activating the fan 28 to impel collected impurities through the dust opening 1440 and directing the motor 22 to reverse, which rotates the driving rod 24 in reverse. Thereafter, the driving rod 24 directs the cleaning brush 26 to reciprocate back along the driving rod 24. When control switch 104 is activated again, the cleaning device 20 stops.

A dust removing plate 148 at the housing 10 close to the dust opening 1440 is T shaped and includes a button 1481 and a dust cleaning plate 1482. The dust cleaning plate 1482 is slidably disposed on one end of the dust receiving cavity 141 close to the dust opening 1440. The button 1481 drives the dust cleaning plate 1482 to slide to the dust opening 1440 to impel the impurities out of the dust opening 144, to be cleaned by performing clean manipulation as stated above several times.

In the embodiment, the cleaning device 20 includes five motors 22 and five driving rods 24. Five horizontal gaps are disposed on the a plurality of rows of keys 32. The motor 22 driving rods 24 are allocated at the five horizontal gaps of the a plurality of rows of keys 32 accordingly. In other embodiments, the cleaning device 20 includes only one motor 22 controlling all the driving rods 24.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A keyboard comprising:
   a housing defining a dust opening,
   a plurality of rows of keys mounted in the housing, each pair of adjacent rows of the keys forming a horizontally extending gap; and
   at least one cleaning device secured in one of the horizontally extending gaps, the at least one cleaning device comprising:
   a driving rod, one end of which is rotatably fixed on a sidewall of the housing and an other end driven to rotate the driving rod, wherein the driving rod has an outer thread thereon;
   a motor connected with and rotating the other end of the driving rod; and
   a cleaning brush, comprising a sleeve and a plurality of arms fixed on the outer surface of the sleeve, wherein the sleeve has an inner thread engaging the outer thread of the driving rod, and wherein the driving rod rotates to move the cleaning brush in opposite directions along the driving rod.

2. The keyboard as described in claim 1, wherein the plurality of arms are made of a soft material.

3. The keyboard as described in claim 1, wherein the housing comprises at least one fixing hole, in one of which the other end of the driving rod is received.

4. The keyboard as described in claim 1, wherein the keyboard further comprises a detection device mounted on the sidewall of the housing, detecting a position of the cleaning brush and controlling the direction of the motor correspondingly.

5. The keyboard as described in claim 1, wherein the housing comprises a base cover connected to an upper cover, wherein the base cover defines a cavity therein divided into a receiving cavity and a dust receiving cavity; the isolation plate defining at least one notch supporting the at least one driving rod.

6. The keyboard as described in claim 5, wherein the plurality of rows of keys are received in the receiving cavity.

7. The keyboard as described in claim 5, wherein the keyboard further comprises a fan fixed on one end of the dust receiving cavity away from the dust opening.

8. The keyboard as described in claim 7, wherein the keyboard further comprises a control switch secured on the upper cover for turning the motor and the fan on and off.

9. The keyboard as described in claim 5, wherein the housing further comprises a dust removing plate, T shaped and comprising a button and a dust cleaning plate, wherein the dust cleaning plate is slidably disposed on one end of the dust receiving cavity close to the dust opening.

\* \* \* \* \*